United States Patent
Bontu et al.

(10) Patent No.: US 12,267,859 B2
(45) Date of Patent: Apr. 1, 2025

(54) RESOURCE ALLOCATION IN MU-MIMO OFDMA WIRELESS SYSTEMS

(71) Applicant: Telefonaktiebolaget LM Ericsson (publ), Stockholm (SE)

(72) Inventors: Chandra Bontu, Nepean (CA); Jagadish Ghimire, Kanata (CA); Amr El-Keyi, Kanata (CA)

(73) Assignee: Telefonaktiebolaget LM Ericsson (Publ, Stockholm (SE)

( * ) Notice: Subject to any disclaimer, the term of this patent is extended or adjusted under 35 U.S.C. 154(b) by 685 days.

(21) Appl. No.: 17/441,381

(22) PCT Filed: Mar. 25, 2020

(86) PCT No.: PCT/IB2020/052826
§ 371 (c)(1),
(2) Date: Sep. 21, 2021

(87) PCT Pub. No.: WO2020/194210
PCT Pub. Date: Oct. 1, 2020

(65) Prior Publication Data
US 2022/0183021 A1  Jun. 9, 2022

Related U.S. Application Data

(60) Provisional application No. 62/823,248, filed on Mar. 25, 2019.

(51) Int. Cl.
*H04W 72/54* (2023.01)

(52) U.S. Cl.
CPC .................................. *H04W 72/54* (2023.01)

(58) Field of Classification Search
CPC ....................................................... H04W 72/54
See application file for complete search history.

(56) References Cited

U.S. PATENT DOCUMENTS

2012/0257664 A1* 10/2012 Yue ...................... H04B 7/0452
375/267
2014/0133419 A1  5/2014 Nagata et al.
(Continued)

FOREIGN PATENT DOCUMENTS

EP  1370035 A1  12/2003

OTHER PUBLICATIONS

International Search Report and Written Opinion dated Jun. 16, 2020 for International Application No. PCT/IB2020/052826 filed Mar. 25, 2020, consisting of 12-pages.
(Continued)

*Primary Examiner* — Rhonda L Murphy
(74) *Attorney, Agent, or Firm* — Weisberg I.P. Law. P.A.

(57) ABSTRACT

Embodiments of a method in a network node for resource allocation are disclosed. The method includes selecting a user set of wireless devices from available predefined user sets; estimating expected data rates for the wireless devices in the selected user set for a selected radio resource; computing a weighted sum of the expected rates of the wireless devices in the user set; and assigning a given the selected radio resource to the user set with the highest weighted sum. A criterion for dynamic resource allocation that can opportunistically exploit the channel variations towards achieving the optimal trade-off between the network capacity and wireless device-fairness is also disclosed.

18 Claims, 12 Drawing Sheets

(56) References Cited

U.S. PATENT DOCUMENTS

2014/0307637 A1    10/2014    Pupala et al.
2022/0264608 A1*    8/2022    Bae .................. H04L 1/0072

OTHER PUBLICATIONS

3GPP TS 38.211 V15.1.0; 3rd Generation Partnership Project; Technical Specification Group Radio Access Network; NR; Physical Channels and modulation (Release 15); Mar. 2018, consisting of 90-pages.

3GPP TS 38.214 V15.1.0; 3rd Generation Partnership Project; Technical Specification Group Radio Access Network; NR; Physical layer procedures for data (Release 15); Mar. 2018, consisting of 77-pages.

3GPP TR 38.900 V15.0.0; 3rd Generation Partnership Project; Technical Specification Group Radio Access Network; Study on channel model for frequency spectrum above 6 GHZ (Release 15); Mar. 2018, consisting of 85-pages.

Xiaolu Zhang et al.; A Generalized Gradient Scheduling Algorithm in Wireless Networks for Variable Rate Transmission; IEEE Globecomm 2007-IEEE Global Telecommunications Conference, 2007, consisting of 5-pages.

Jeonghoon Mo et al.; Fair End-to-End Window-Based Congestion Control; IEEE/ACM Transactions on Networking, vol. 8, No. 5, Oct. 2000, consisting of 12-pages.

Guocong Song et al.; Cross-Layer Optimization for OFDM Wireless Networks—Part I: Theoretical Framework; IEEE Transactions on Wireless Communications, vol. 4, No. 2, Mar. 2005, consisting of 11-pages.

Sanam Sadr et al.; Radio Resource Allocation Algorithms for the Downlink of Multiuser OFDM Communication Systems; IEEE Communications Surveys & Tutorials, vol. 11, No. 3, Third Quarter 2009, consisting of 15-pages.

Pu-Hsuan Lin et al.; Performance Analysis and Algorithm Designs for Transmit Antenna Selection in Linearly Precoded Multiuser MIMO Systems; IEEE Transactions on Vehicular Technology, vol. 61, No. 4, May 2012, consisting of 11-pages.

Namshik Kim et al.; Performance Analysis of MIMO System with Linear MMSE Receiver; IEEE Transactions on Wireless Communications, vol. 7, No. 11, Nov. 2008, consisting of 12-pages.

Pramrod Viswanath et al.; Opportunistic Beamforming Using Dumb Antennas; IEEE Transactions on Information Theory, vol. 48, No. 6, Jun. 2002, consisting of 18-pages.

Xiaoxin Qiu et al.; On the Performance of Adaptive Modulation in Cellular Systems; IEEE Transactions on Communications, vol. 47, No. 6, Jun. 1999, consisting of 12-pages.

3GPP TS 36.213 V15.1.0; 3rd Generation Partnership Project; Technical Specification Group Radio Access Network; Evolved Universal Terrestrial Radio Access (E-UTRA); Physical layer procedures (Release 15); Mar. 2018, consisting of 499-pages.

* cited by examiner

System block diagram for numerical evaluation

System block diagram for numerical evaluation

RESOURCE ALLOCATION IN MU-MIMO OFDMA WIRELESS SYSTEMS

CROSS-REFERENCE TO RELATED APPLICATIONS

This application is a Submission Under 35 U.S.C. § 371 for U.S. National Stage Patent Application of International Application No.: PCT/IB2020/052826, filed Mar. 25, 2020 entitled "RESOURCE ALLOCATION IN MU-MIMO OFDMA WIRELESS SYSTEMS BASED ON DATA RATE OF USERS SET," which claims priority to U.S. Provisional Application No. 62/823,248, filed Mar. 25, 2019, entitled "RESOURCE ALLOCATION IN MU-MIMO OFDMA WIRELESS SYSTEMS," the entireties of both of which are incorporated herein by reference.

TECHNICAL FIELD

The present disclosure relates to wireless communications, and in particular, to resource allocation in MU-MIMO OFDMA wireless systems.

BACKGROUND

With the introduction of Advanced Antenna Systems (AAS) in cellular communication standards, such as LTE and NR, same resource can be allocated simultaneously to multiple wireless devices via spatial multiplexing. However, this raises new challenges to resource allocation strategy to decide opportunistic co-scheduling on a given resource to increase the system capacity without adversely impacting the wireless device fairness. In addition, the effects of transmit power sharing and the inter-wireless device interference on co-scheduling need to be considered in the allocation decision.

Resource allocation in wireless systems is typically characterized by an inherent trade-off between resource fairness and resource utilization efficiency across all the connected wireless devices or user equipment (UE) that are actively communicating. A general resource allocation framework is expected to provide a mechanism to exploit this trade-off, by allowing the network operators to choose the desired tradeoff, i.e., the "fairness level". "Network Utility Maximization (NUM)" is an approach that can be used in designing such resource allocation algorithms [1]. In NUM approach, a resource is allocated to the active wireless devices such that the sum of per-wireless device utilities across the active wireless devices is maximized. The utility function is typically expressed as a function of average throughput, either till the current resource allocation decision instant, or at the current resource allocation decision instant, or a combination thereof [2][3].

In cellular OFDMA wireless systems, such as, the Third Generation Partnership Project (3GPP) Long-Term Evolution (LTE) and NR, the available channel bandwidth in each time slot or subframe is divided into small consecutive group of subcarriers, referred to as physical resource blocks (PRBs). PRBs in each subframe are allocated to wireless devices within a cell. In other words, a PRB at a given subframe is the fundamental unit of resource allocation. If we take the NUM approach outlined above, resource allocation for these systems would translate to PRB allocation scheme where a PRB is allocated to a wireless device such that the sum of utilities across all the active wireless devices is maximized. The utility function, as mentioned earlier is predefined based on the desired fairness level.

There have been numerous studies on resource allocation algorithms in wireless networks. In the survey article [3], a classification of the various approaches is presented. Many of these studies have employed utility maximization approach in the problem formulation. For example, [2] presents a framework for cross-layer optimization for OFDMA wireless networks towards maximizing the average utility of wireless devices and presents optimality conditions, by exploiting the multi-wireless device diversity, time diversity as well as frequency diversity inherent to OFDMA systems.

Though an extensive research is available on dynamic resource allocation for OFDMA systems, most of this work assumes Single-Wireless device (SU)-MIMO constraints, i.e., a PRB can only be assigned to one wireless device at a time. However, with the advent of Advanced Antenna Systems (AAS) with potentially large number of transmit antennas, modern wireless networks (including LTE and NR) can already support MU-MIMO transmissions where multiple wireless devices can be "co-scheduled" on the same PRB. With proper spatial filtering (also known as precoding), the transmitter can mitigate the inter-wireless device interference between the co-scheduled wireless devices.

The above opens new challenges for allocation of the available resources. In particular: co-scheduling wireless devices in a given PRB affects the channel quality due to transmit power sharing and inter-wireless device interference; and decision on which wireless devices to co-schedule in a particular PRB might be very different based on whether the objective is to maximize the throughput or to maintain the predefined fairness criteria.

Above noted characteristics of a MU-MIMO system make the simple generalization of SU-MIMO results in MU-MIMO context infeasible. It is desirable to include co-scheduling decision as part of the resource allocation problem to fully exploit the fairness/capacity trade-off. MU-MIMO has been extensively studied at physical layer level and seen as a technique to increase network capacity. However, this can adversely affect the wireless device fairness. MU-MIMO in the context of dynamic resource allocation (DRA) with wireless device fairness has not been explored in the known art.

SUMMARY

Some embodiments advantageously provide methods and apparatuses for resource allocation in MU-MIMO OFDMA wireless systems.

A criterion for dynamic resource allocation that can opportunistically exploit the channel variations towards achieving the optimal trade-off between the network capacity and wireless device-fairness is disclosed.

In one aspect of the disclosure, a method of resource allocation at a network node comprises at least one of: selecting a user set of wireless devices from available predefined user sets; estimating expected data rates for the wireless devices in the selected user set for a selected radio resource; computing a weighted sum of the expected rates of the wireless devices in the user set; and assigning a given the selected radio resource to the user set with the highest weighted sum.

In another aspect of the disclosure, a method of resource allocation at a network node comprises: for each user set among at least two predefined user sets: estimating expected data rates for wireless devices in the user set; and computing a weighted sum of the expected rates of the wireless devices in the user set. The selected radio resource is assigned to the user set with the highest weighted sum.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
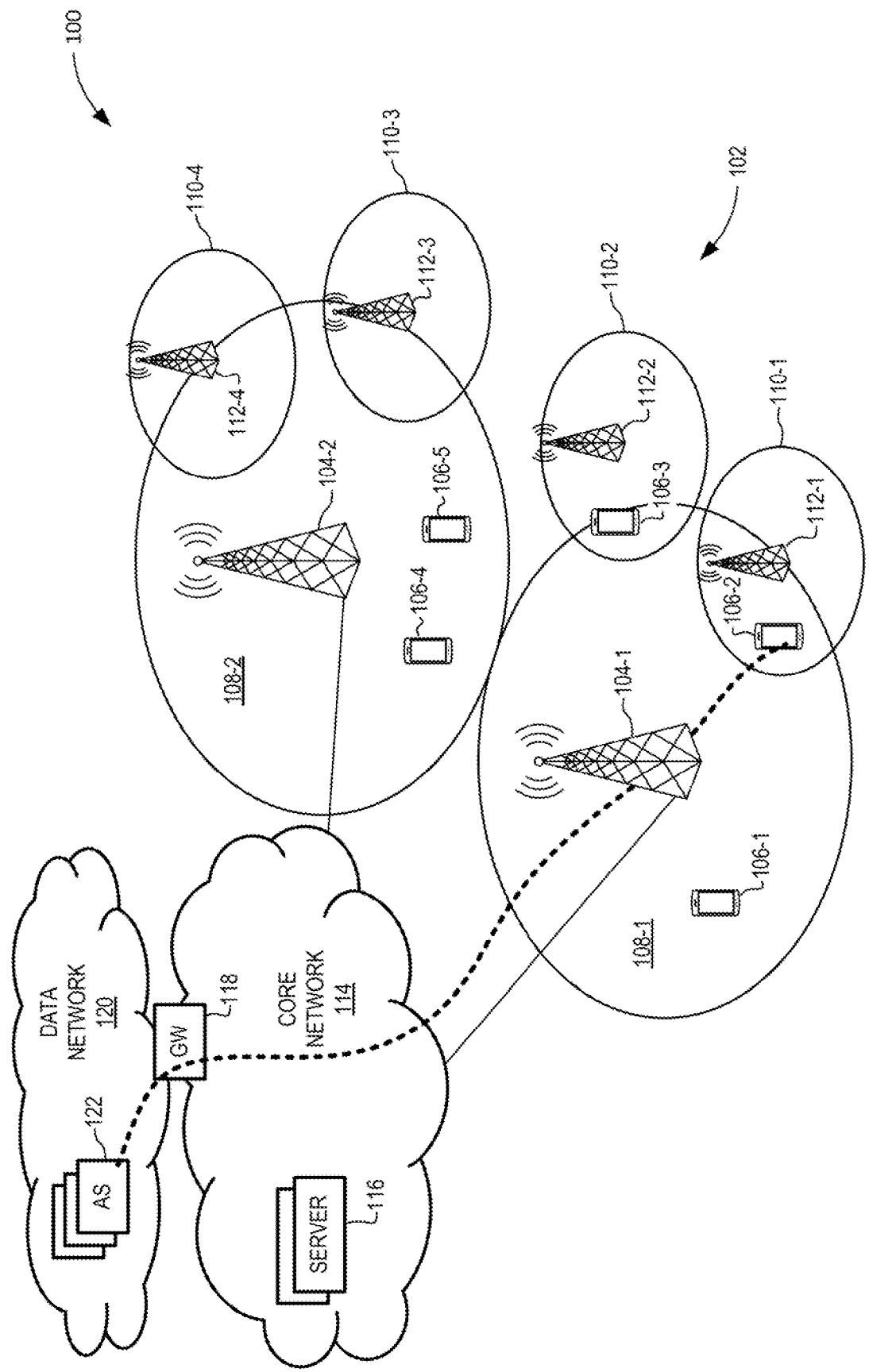
FIG. 1 is a block diagram schematically illustrating a representative network in which embodiments of the present invention may be deployed.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE Wireless device Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Before describing in detail example embodiments, it is noted that the embodiments reside primarily in combinations of apparatus components and processing steps related to resource allocation in MU-MIMO OFDMA wireless systems. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or a wireless connections.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting (and/or receiving) signals to (and/or from) a radio access node. Some examples of a wireless device include, but are not limited to, a Wireless device Equipment device (UE) in a 3GPP network and a Machine Type Communication (MTC) device.

Network Node: As used herein, a "network node" is any node that is either part of the radio access network or the core network of a cellular communications network/system.

Cell: As used herein, a "cell" is a combination of radio resources (such as, for example, antenna port allocation, time and frequency) that a wireless device may use to exchange radio signals with a radio access node, which may be referred to as a host node or a serving node of the cell. However, it is important to note that beams may be used instead of cells, particularly with respect to 5G NR. As such, it should be appreciated that the techniques described herein are equally applicable to both cells and beams.

Note that references in this disclosure to various technical standards (such as 3GPP TS 38.211 V15.1.0 (2018-03) and 3GPP TS 38.214 V15.1.0 (2018-03), for example) should be understood to refer to the specific version(s) of such standard(s) that is (were) current at the time the present application was filed, and may also refer to applicable counterparts and successors of such versions.

The description herein focuses on a 3GPP cellular communications system and, as such, 3GPP terminology or terminology similar to 3GPP terminology is oftentimes used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 illustrates one example of a cellular communications network 100 in which embodiments of the present disclosure may be implemented. In the embodiments described herein, the cellular communications network 100 is a Public Land Mobility Network (PLMN) conforming to one or more of the LTE, 3G, 4G and 5G NR standards, or their successors. In the illustrated example, the cellular communications network 100 includes a (Radio) Access Network ((R)AN) 102 comprising base stations 104-1 and 104-2 controlling radio communications with wireless devices 106-1, 106-2, 106-3, 106-4, 106-5 within corresponding macro cells 108-1 and 108-2. Each macro cell 108 may be defined by any suitable combination of geography, frequency, Radio Access Technology (RAT) and modulation scheme.

Base stations 104 can be any type of network access device capable of establishing radio connection(s) with one or more wireless devices 106 within a respective coverage area of the base station 104 or low power node 112, and further configured to forward subscriber traffic between the core network 114 and the one or more wireless devices 106. An important feature of a base station 104 is that it is configured with both a radio interface configured to send and receive radio signals to and from a wireless device 106, and a network interface configured to exchange electronic and/or optical signals with the core network 114. Examples of base stations 104 and low power nodes 112 include: Evolved Node B (eNB) systems (known, for example, in the 3GPP standards): WiFi access points (known, for example from IEEE 802.11 standards) or the like. In some contexts, a base station 104 may be referred to as an access point (AP) regardless of the Radio Access Technology (RAT) that it supports.

The illustrated (R)AN 102 also includes small cells 110-1 through 110-4, within which radio communication can be controlled by corresponding low power nodes 112-1 through 112-4. As with the macro cells 108, each small cell may be defined by any suitable combination of geography, frequency, Radio Access Technology (RAT) and modulation scheme. As with the base stations 104, a low power node 112 can be any type of network access device capable of establishing radio connection(s) with one or more wireless devices 106 within a respective coverage area of the low power node 112, and further configured to forward subscriber traffic between the core network 114 and the one or more wireless devices 106. An important feature of a low power node 112 is that it is configured with both a radio interface configured to send and receive radio signals to and from a wireless device 106, and a network interface configured to exchange electronic and/or optical signals with the core network 114. In some embodiments, a low power node 112 may be connected to the core network 114 by a direct connection, such as an optical cable. In other embodiments, a low power node 112 may be connected to the core network 114 by an indirect connection, such as via a radio or optical fiber link to a base station 104. Examples of low power nodes 112 include: Remote Radio Heads (RRHs) connected to a base station or a network router (not shown): WiFi access points or the like. In some contexts, a low power node 112 may be referred to as an access point (AP) regardless of the specific Radio Access Technology (RAT) that it supports.

Notably, while not illustrated, a particular small cell 110 may alternatively be controlled by a base station 104, for example using a beam-forming technique. In such cases, the particular small cell 110 will not be associated with a respective low power node 112 per se. Rather, the particular small cell 110 will be associated with a respective set of parameters implemented in the base station 104. In this disclosure, the term "cell" is used to refer to a defined combination of parameters (such as geography, frequency, Radio Access Technology (RAT), modulation scheme, identifiers and the like) that can be used by a wireless device 106 to access communication services of the network 100. The term "cell" does not imply any particular parameter values, or any particular physical configuration of devices needed to enable a wireless device 106 to access those communication services.

Wireless devices 106 can be any type of device capable of sending and receiving radio signals to and from a base station 104 and/or low power node 112. Examples of wireless device 106 include cellular phones, Personal Data Assistants (PDAs), mobile computers, Internet of Things (IoT) devices, autonomous vehicle controllers, and the like. In some contexts, a wireless device 106 may be referred to as a Wireless device Equipment (UE) or a mobile device.

In some embodiments, the macro cells 108-1 and 108-2 may overlap each other, and may also overlap one or more small cells 110. For example, a particular macro cell 108-1 may be one macro cell 108 among a plurality of macro cells covering a common geographical region and having a common RAT and modulation scheme, but using respective different frequencies and/or AP identifiers. In such cases, a wireless device 106 located within a region covered by two or more overlapping cells 108, 112 may send and receive radio signals to and from each of the corresponding base stations 104 and/or low power nodes 112.

In the illustrated example, the (R)AN 102 is connected to a Core Network (CN) 114, which may also be referred to as Evolved Core Network (ECN) or Evolved Packet Core (EPC). The CN 114 includes (or, equivalently, is connected to) one or more servers 116 configured to provide networking services such as, for example, Network Functions (NFs) described in 3GPP TS 23.501 V15.2.0 (2018-06) "System Architecture for the 5G System" and its successors. The CN 114 also includes one or more gateway (GW) nodes 118 configured to connect the CN 114 to a packet data network (DN) 120 such as, for example, the internet. A gateway node 118 may be referred to as a packet gateway (PGW) and/or a serving gateway (SGW). The DN 120 may provide communications services to support end-to-end communications between wireless devices 106 and one or more application servers (ASs) 122 configured to exchange data packet flows with the wireless devices 106 via the CN 114 and (R)AN 102. In some contexts, an application server (AS) 122 may also be referred to as a host server.

In some contexts, an end-to-end signal path between an AS 122 and one or more wireless devices 106 may be referred to as an Over-The-Top (OTT) connection. Similarly, a communication service that employs signal transmission between an AS 122 and one or more wireless devices 106 may be referred to as an OTT service.

It should be appreciated that the separation between the CN 114 and the DN 120 can be purely logical, in order to simplify understanding of their respective roles. In particular, the CN 114 is primarily focused on providing wireless device access services and supporting wireless device mobility. On the other hand, the DN 120 is primarily focused on providing end-to-end communications, particularly across network domains. However, it will be appreciated that both the CN 114 and the DN 120 can be implemented on common physical network infrastructure, if desired.

Figure 2A:
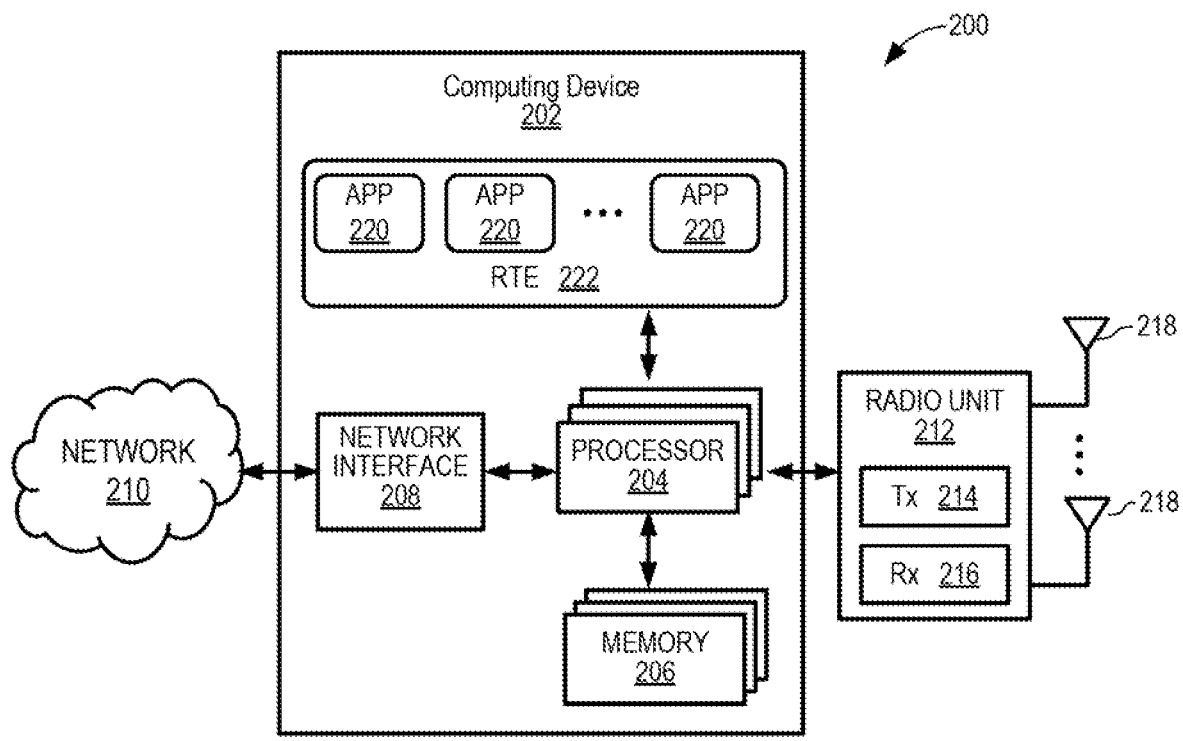
FIGS. 2A and 2B are block diagrams schematically illustrating examples of a computing device usable in embodiments of the present invention.
Figure 2B:
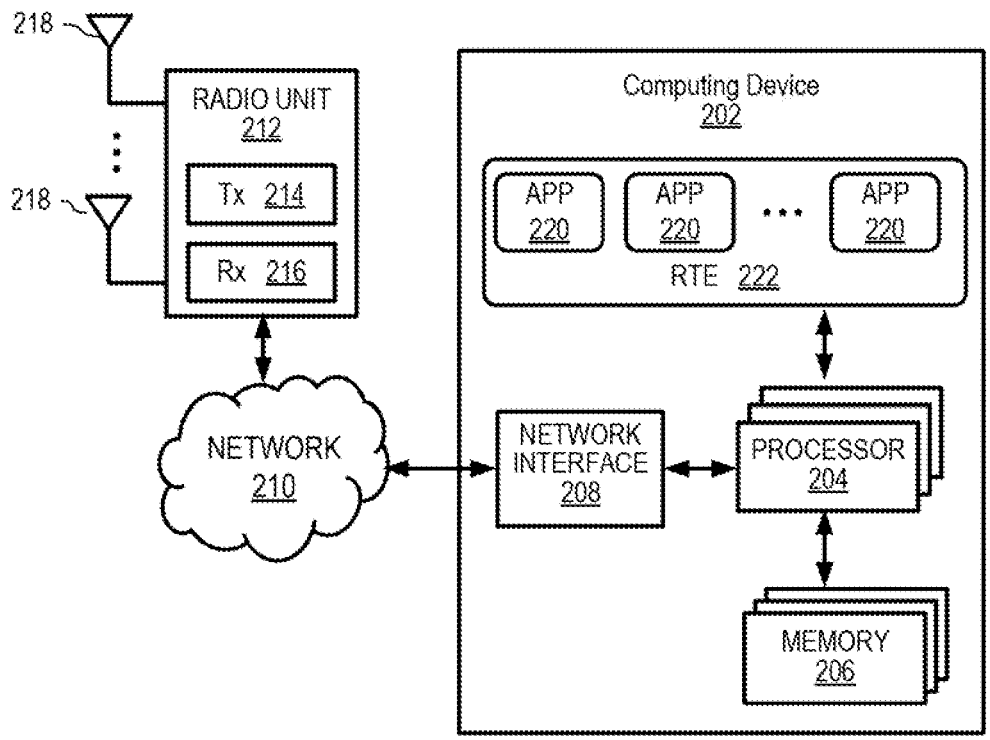

FIGS. 2A and 2B are block diagrams schematically illustrating a communications system 200 including a computing device 202 usable in embodiments of the present invention. In various embodiments, any or all of the base stations 104 or 112, wireless devices 106, core network servers 116 or gateways 118 and data network servers 122 may be implemented using systems and principles in accordance with the computing device 202. It may also be appreciated that any or all of the elements of the network 100 may be virtualized using techniques known in the art or developed in the future, in which case the functions of any or all the base stations 104 or 112, core network servers 116 or gateways 118, and/or any or all of the network functions QQ206-QQ236 may be implemented by suitable software executing within a computing device 202 or within a data center (non shown) composed of multiple computing devices 202.

In the example of FIG. 2A, the communications system 200 generally includes computing device 202 connected to one or more networks 210 and one or more radio units 212. The computing device 202 includes processing circuitry such as one or more processors 204, a memory 206, one or more network interfaces 208. The processors 204 may be provided as any suitable combination of Central Processing Units (CPUs), Application Specific Integrated Circuits (ASICs), Field Programmable Gate Arrays (FPGAs), or the like. Similarly, the memory 206 may be provided as any suitable combination of Random Access Memory (RAM), Read Only Memory (ROM) and mass storage technologies such as magnetic or optical disc storage or the like. The network interfaces 208 enable signaling between the computing device 200 and the networks 210, such as the Core Network 114, the data network 120, or a private domain network such as a data center (not shown).

Each radio unit 212 typically includes at least one transmitter (Tx) 214 and at least one receiver (Rx) 216 coupled to one or more antennas 218. In the example of FIG. 2A, the radio unit(s) 212 is(are) shown as being external to the computing device 202 and connected to the computing device 202 via a suitable physical connection (such as a copper cable or an optical cable). In the example of FIG. 2B, the radio unit(s) 212 is(are) shown as being connected to computing device 202 via a network 210 and a network interface 208. In still other embodiments, the radio unit(s) 212 and optionally also the antenna(s) 218 may be integrated together with the computing device 202.

The one or more processors 204 operate to provide functions of the computing device 202. Typically, these function(s) are implemented as software applications (APPs) 220 or modules that are stored in the memory 206, for example, and executed by the one or more processors 204. In some embodiments, one or more software applications or modules 220 may execute within a secure run-time environment (RTE) 222 maintained by an operating system (not shown) of the computing device 202.

It may be appreciated that specific embodiments may exclude one or more of the elements illustrated in FIGS. 2A and 2B. For example, a computing device 202 configured to implement a wireless device 106 may incorporate processing circuitry including one or more processors 204, a memory 206, and one or more radio units 212, but may exclude a network interface 208. Conversely, a computing device 202 configured to implement a server 116 or 122 may include processing circuitry including one or more processors 204, a memory 206, and one or more network interfaces 208, but may exclude radio units 212. A computing device 202 configured to implement a base station 104 or 112, on the other hand, will normally include processing circuitry including one or more processors 204, a memory 206, and both radio units 212 and network interfaces 208.

Figure 3:
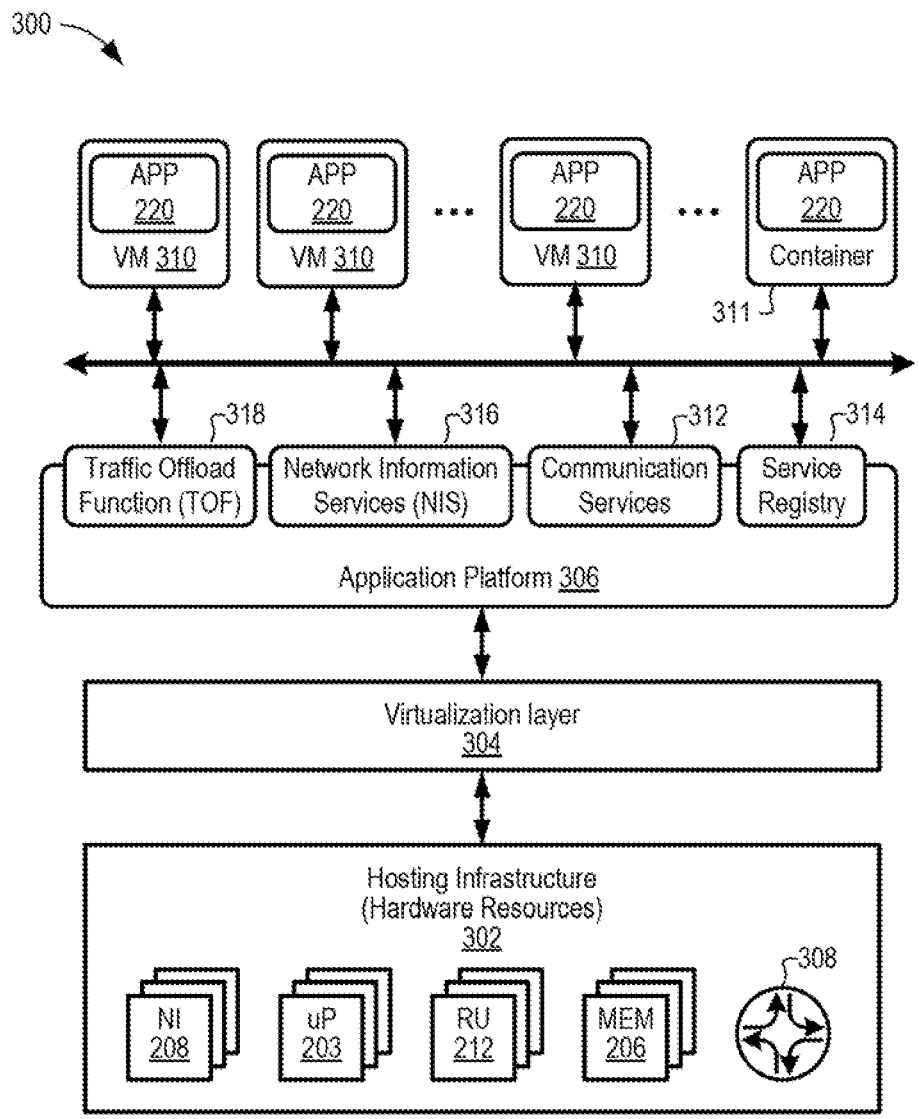
FIG. 3 is a block diagram schematically illustrating an architecture of a representative network element virtualization usable in embodiments of the present invention.

FIG. 3 is a block diagram schematically illustrating an example architecture for network element virtualization usable in embodiments of the present invention. It is contemplated that the network elements may be physically implemented using one or more computers, data storage devices and routers (any or all of which may be constructed in accordance with the system 200 described above with reference to FIG. 2) interconnected together and executing suitable software to perform its intended functions. Those of ordinary skill will recognize that there are many suitable combinations of hardware and software that may be used for this purpose, which are either known in the art or may be developed in the future. For this reason, a figure showing physical hardware components and connections is not included herein.

As may be seen in FIG. 3, the illustrated architecture 300 generally comprises hosting infrastructure 302, a virtualization layer 304 and an Application Platform Services layer 306. The hosting infrastructure 302 comprises physical hardware resources provided by the infrastructure on which the architecture 300 is being implemented. These physical hardware resources may include any or all of the processors 204, memory 206, network interfaces 208 and radio units 212 described above with reference to FIG. 2, and may also include traffic forwarding and routing hardware 308. The virtualization layer 304 presents an abstraction of the hardware resources 302 to the Application Platform Services layer 306. The specific details of this abstraction will depend on the requirements of the applications 220 being hosted by the Application Platform Services layer 306. Thus, for example, an APP 220 that provides traffic forwarding functions may be presented with an abstraction of the hardware resources 306 (e.g. processor(s) 204, memory 206 and traffic forwarding hardware 308) that simplifies the implementation of traffic forwarding policies. Similarly, an application that provides data storage functions may be presented with an abstraction of the hardware resources 306 (e.g. processor(s) 204 and memory 206) that facilitates the storage and retrieval of data (for example using Lightweight Directory Access Protocol—LDAP).

The application platform 306 provides the capabilities for hosting applications. In some embodiments, the application platform 306 supports a flexible and efficient multi-tenancy run-time and hosting environment for applications 220 by providing Infrastructure as a Service (IaaS) facilities. In operation, the application platform 306 may provide a security and resource "sandbox" for each application 220 being hosted by the platform 306. Each "sandbox" may be implemented as a Virtual Machine (VM) image 310 that may include an appropriate operating system and controlled access to (virtualized) hardware resources 302. Alternatively, each "sandbox" may be implemented as a container 311 that may include appropriate virtual memory and controlled access to host operating system and (virtualized) hardware resources 302. The application platform 306 may also provide a set of middleware application services and infrastructure services to the applications 220 hosted on the application platform 306, as will be described in greater detail below.

Applications 220 from vendors, service providers, and third-parties may be deployed and executed within a respective Virtual Machine 310. For example, PCF 220 may be implemented by means of one or more applications 220 hosted on the application platform 306 as described above. Communication between applications 220 and services of the application platform 306 may conveniently be designed according to the principles of Service-Oriented Architecture (SOA) known in the art.

Communication services 312 may allow applications 220 to communicate with the application platform 306 (through pre-defined Application Programming Interfaces (APIs) for example) and with each other (for example through a service-specific API).

A Service registry 314 may provide visibility of the services available on the computing device 200. In addition, the service registry 314 may present service availability (e.g. status of the service) together with the related interfaces and versions. This may be used by applications 220 to discover and locate the end-points for the services they require, and to publish their own service end-point for other applications to use.

Network Information Services (NIS) 316 may provide applications 220 with low-level network information pertaining to a network service instance or one or more PDU sessions, for example. For example, the information provided by NIS 316 may be used by an application 220 to calculate and present relevant data (such as: cell-ID, location of the subscriber, cell load and throughput guidance) to session, access and policy control functions, any or all of which may themselves be implemented by applications 220 executing in respective VMs 310 or containers 311.

A Traffic Off-Load Function (TOF) service 318 may prioritize traffic, and route selected, policy-based, data streams to and from applications 220.

Note that although terminology from one particular wireless system, such as, for example, 3GPP LTE, may be used in this disclosure, this should not be seen as limiting the scope of the disclosure to only the aforementioned system.

Embodiments provide methods, wireless devices and network nodes for resource allocation in MU-MIMO OFDMA wireless systems A criterion for dynamic resource allocation that can opportunistically exploit the channel variations towards achieving the optimal trade-off between the network capacity and wireless device-fairness is disclosed.

In one aspect of the disclosure, a method of resource allocation at a network node comprises: selecting a set of wireless devices from available predefined user sets; estimating expected data rates for the wireless devices in the selected user set for a selected radio resource; computing a weighted sum of the expected rates of the wireless devices in the selected user set; and assigning the selected radio resource to the user set with the highest weighted sum.

Figure 4A:
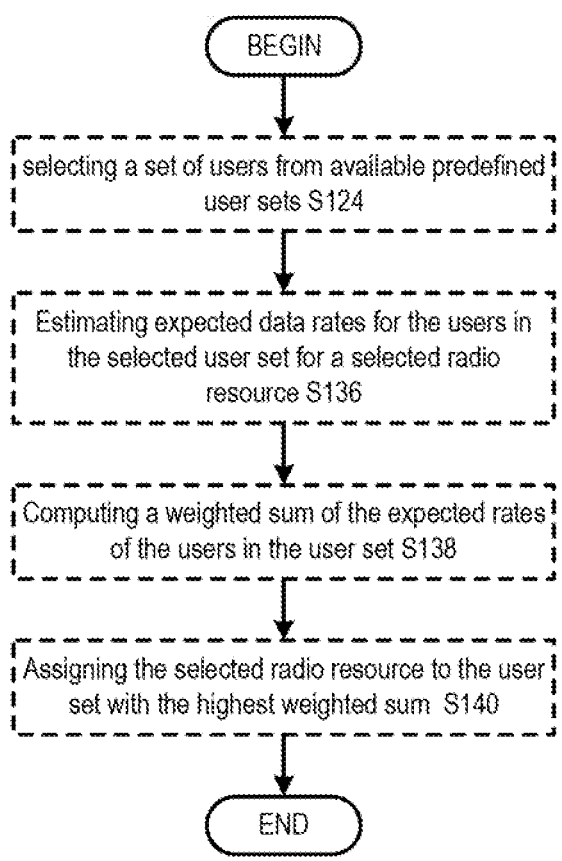
FIGS. 4A and 4B are flowcharts of example processes in a network node for resource allocation according to some embodiments of the present disclosure.
Figure 4B:
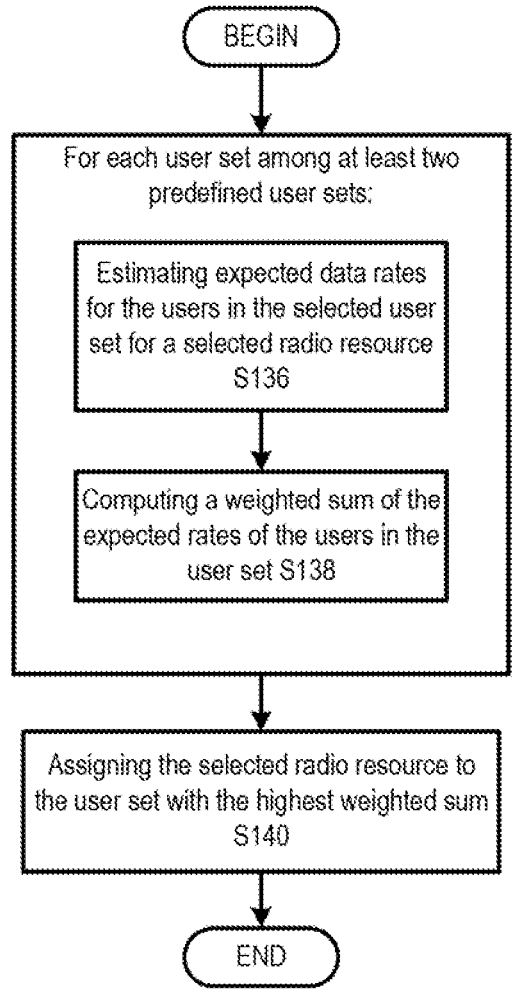

FIGS. 4A and 4B are \ flowcharts of example processes in a network node 104 for resource allocation according to some embodiments of the present disclosure. Optional steps are indicated via dashed lines. The process of FIG. 4A includes one or more of the following steps, performed a wireless device selector module or unit which may be implemented as an app 220 executing in any of an RTE 222, a VM 310 or a container 310: Selecting a set of wireless devices from available predefined user sets (block S134), estimating expected data rates for the wireless devices in the selected user set for a selected radio resource (block S136), computing a weighted sum of the expected rates of the wireless devices in the user set (block S138), and assigning the selected radio resource to the user set with the highest weighted sum (block S140). The process of FIG. 4B includes, for each user set among at least two predefined user sets: estimating expected data rates for the wireless devices in the selected user set for a selected radio resource (block S136), and computing a weighted sum of the expected rates of the wireless devices in the user set (block S138). The selected radio resource is assigned to the user set with the highest weighted sum (block S140).

Figure 5:
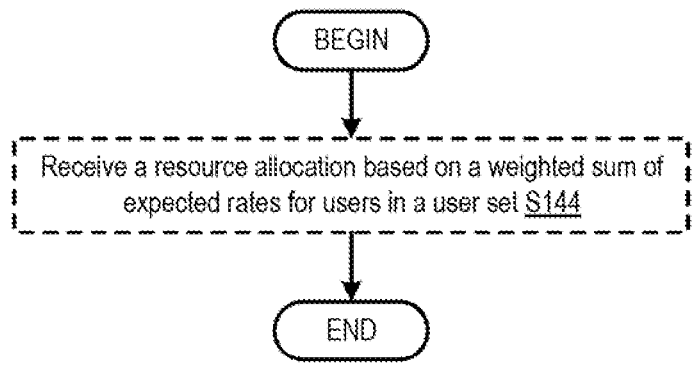
FIG. 5 is a flowchart of an example process in a wireless device for receiving resource allocation according to some embodiments of the present disclosure.

FIG. 5 is a flowchart of an example process in a wireless device 106 for receiving resource allocation according to some embodiments of the present disclosure. Optional steps are indicated via dashed lines. The process includes receiving, via an allocation receiver which may be implemented as an app 220 executing in any of an RTE 222, a VM 310 or a container 310, a resource allocation based on a weighted sum of expected rates for wireless devices in a user set (block S144), for example determined according to a method at a network node as described in FIG. 4.

Embodiments discussed herein provide a method that of co-scheduling of wireless devices that may result in significant increase in average wireless device throughput.

The maximum achievable average wireless device throughput may be significantly improved without affecting the minimum wireless device throughput.

Moreover, even though MU-MIMO is often considered as a capacity enhancing technique at the physical layer, it is shown that resource allocation strategy may be important in guaranteeing wireless device fairness/satisfaction without adversely affecting the throughput/capacity gains.

Figure 6:
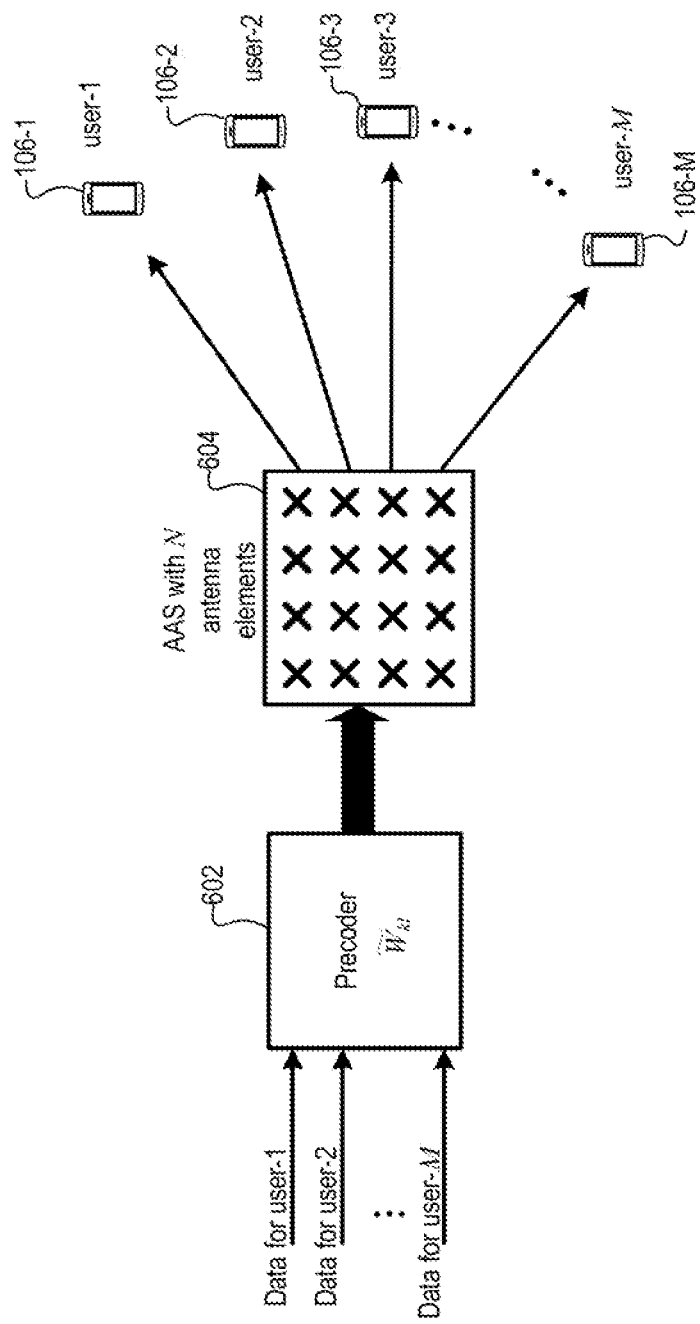
FIG. 6 illustrates a block diagram of an MU-MIMO transmission on downlink according to some embodiments of the present disclosure.

As illustrated in FIG. 6 in OFDMA based MU-MIMO system, the same PRB can simultaneously be allocated to one or more wireless devices. This can be done in various ways, for example, by appropriately precoding the data transmission such that the data transmitted towards an intended wireless device is nulled towards other wireless devices. As depicted, the data for each of users-1 to M is precoded (e.g. by precoder 602) by a N×M dimensional matrix $\tilde{W}_{kl}$ and subsequently transmitted over an N antenna element AAS 604. The wireless devices 106 decode their data without the knowledge of the other wireless devices that are co-scheduled on the resource. Therefore, the base station 104, 112 determines the precoder such that the data received at one wireless device is not affected adversely by the data transmission towards the other wireless devices, i.e., by controlling the inter-wireless device interference to a desired level. Note that even in MU-MIMO systems, it might be beneficial to allocate some PRBs on certain subframes to only one wireless device or a subset of active wireless devices to meet a predefined objective. Certain embodiments of this disclosure provide a methods and apparatuses that determine which wireless devices should be allocated to a given PRB at given subframe and/or allocate resource(s) in connection with this determination.

Figure 7:
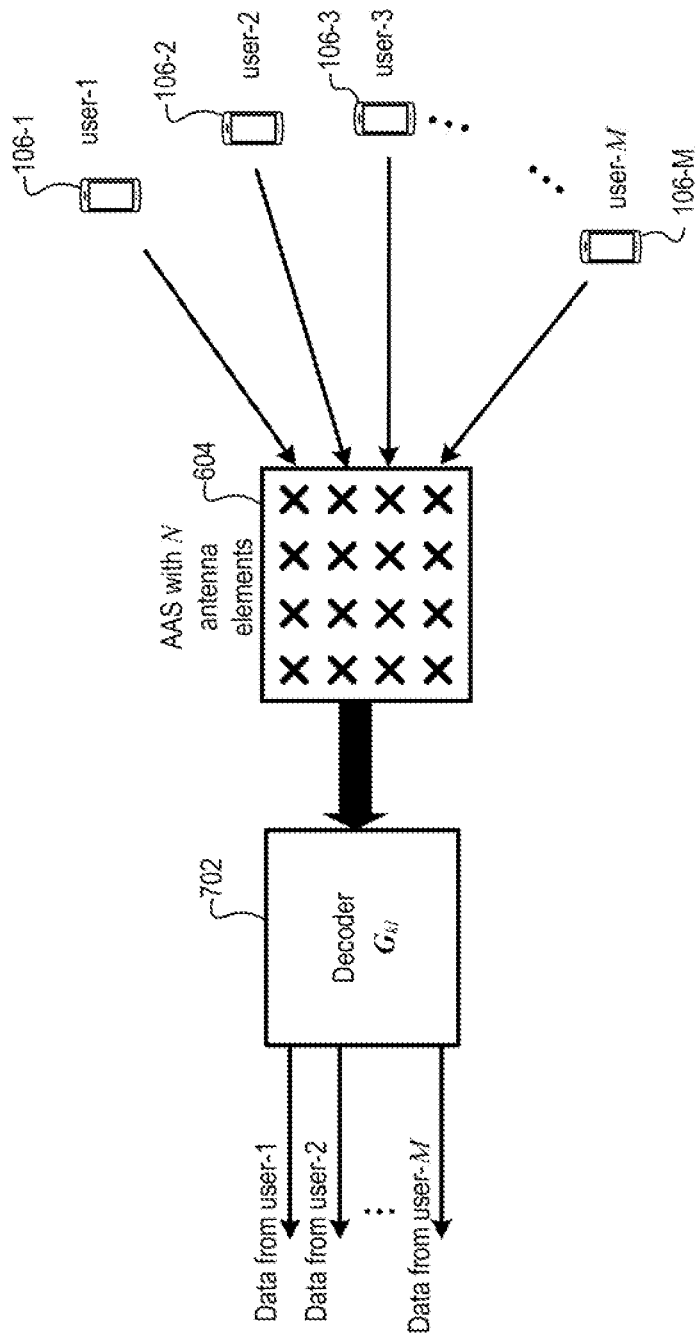
FIG. 7 illustrates a block diagram of an MU-MIMO transmission on uplink according to some embodiments of the present disclosure.

As illustrated in FIG. 7 the same PRB can be granted to one or more wireless devices 106 for simultaneous uplink transmission. This can be done in various ways, for example, by informing each wireless device 106 to appropriately precode the UL data transmission such that the data transmitted by each wireless device 106 can be detected at the network node 104, 112 with minimal inter-wireless device interference. As depicted, the precoded data for wireless devices-1 to M received via the AAS is decoded (at 702) by a M×N dimensional matrix $G_{kl}$. The decoder $G_{kl}$, to decode the data from all the co-scheduled wireless devices on resource k in subframe l is determined such that the inter-wireless device interference is suppressed. Unlike in the DL, the network node 104, 112 is aware of the simultaneous transmission from multiple wireless devices. Therefore, the base station 104, 112 can determine an appropriate decoder. The focus of this disclosure is to provide a generic rule to determine which wireless devices should be granted to a given PRB at given subframe for UL transmission.

In the following sections, a criterion for resource allocation in SU-MIMO systems is presented followed by a generalized criterion for resource allocation in MU-MIMO systems. Without loss of generality, the description is mainly focused on DL transmissions, however, the described procedures are equally applicable to UL resource allocation.

Resource Allocation for OFDMA SU-MIMO

Considering a cell consisting of M wireless devices and a set of resources or PRBs, B, the DL resource allocation (DRA) problem for OFDM SU-MIMO is to assign every available resource k at subframe l to an appropriate wireless device. Utility based optimization is to maximize the following sum utility as l→∞:

$$\sum_{i=1}^{M} U_i(\bar{r}_i(l)) \quad \text{(Equ. 1)}$$

subject to $$\cup_{j=1}^{M} D_{j,l'} \subseteq B$$

$$\forall l' \in \{1, 2, \cdots, l\}$$

$$D_{j,l'} \cap D_{m,l'} = \emptyset,$$

$$j, m \in \{1, 2, \ldots, M\};$$

$$j \neq m;$$

$$\forall l' \in \{1, 2, \cdots, l\}$$

where $D_{j,l}$ represents the allocation decision for wireless device-j at subframe l defined as follows:

$D_{j,l} \triangleq \{k \in B: k \text{ is allocated to wireless device j in subframe l}\}$ $U_i(\bar{r}_i(l))$ is the utility for wireless device-i, expressed as a function of the average rate of the wireless device-i up to subframe l, $\bar{r}_i(l)$. As demonstrated in [2], (Equ. 1) is fulfilled, when a resource k at time l is assigned to wireless device-i*, conditioned on the following:

$$i^*: \operatorname*{argmax}_{i} \{c_i(k, l) U_i'(\bar{r}_i(k, l))\} \quad \text{(Equ. 2)}$$

for $i \in \{1, 2, \ldots, M\}$ where $c_i(k,l)$ is the expected throughput for wireless device-i if wireless device-i is scheduled on resource k on subframe l. $U'_i(\bar{r}_i(k,l))$ is the first order derivative of the utility function at $\bar{r}_i(k,l)$, where $\bar{r}_i(k,l)$ is the average rate of wireless device-i obtained up to when scheduling the resource k on subframe l. It should be noted that the search space for finding the appropriate wireless device for each resource k depends on the wireless devices which have data in the buffer in subframe l, which is typically less than M. Note that $\bar{r}_i(l)$ in (Equ. 1) indicates the average rate of wireless device-i measured over all the allocated resources until the start of subframe l, where as $\bar{r}_i(k,l)$ represents the average rate of wireless device-i up to the resource k in subframe l.

In other words, (Equ. 2) states that a resource is allocated to a wireless device with the highest instantaneous throughput weighted by the corresponding marginal gain in utility at the current throughput.

For example, when $U_i(r)=\log(r)$, (Equ. 2) implies that a resource k in subframe l should be allocated to a wireless device which has the highest value of $$\frac{c_i(k, l)}{\bar{r}_i(k, l)},$$

which corresponds to the well-known proportional fair metric.

$c_i(k,l)$ can be expressed for wireless device-i, which is assumed to have $\eta_i$ transmission layers, as the sum of throughputs on all layers.

$$c_i(k, l) = \sum_{\ell=1}^{\eta_i} c_{i,\ell}(k, l) \quad \text{(Equ. 3)}$$

For example, when the available power on resource k in subframe l, p(k, l), is equally divided among the transmission layers, the ith wireless device throughput of each layer can be expressed as follows [8]:

$$c_{i,\ell}(k, l) = N_{RE}^{PRB} \log_2\{1 + \beta \rho_{i,\ell}(k, l, p(k, l)/\eta_i)\}$$

where $\rho_{i,\ell}(k, l, p(k, l)/\eta_i)$ is the signal to interference plus noise ratio (SINR) for $\ell$ th layer of wireless device-i. $\beta$ is a parameter decided based on a target bit error rate (BER) and is defined as $$\beta = \frac{1.5}{-\ln\{5 * BER\}}.$$

$N_{RE}^{PRB}$ represents the number of modulation symbols with data that can be transmitted in one PRB.

The SINR $\rho_{i,\ell}(k, l, p(k, l)/\eta_i)$, for example as shown in [5], can be computed assuming open-loop transmission and minimum mean squared error (MMSE) detection at the wireless device. Alternatively, SINR $\rho_{i,\ell}(k, 1, p(k, 1)/\eta_i)$ can also be computed assuming zero-forcing or MMSE precoded transmission [6].

In the next section, a mathematically optimum solution is derived for MU-MIMO, where a resource can be simultaneously shared by multiple wireless devices.

Resource Allocation for OFDMA MU-MIMO

Considering a cell consisting of M wireless devices and a set of PRBs, B, DRA problem for OFDMA MU-MIMO is to assign every available resource k at time l to an appropriate set of wireless devices. Utility based optimization is to maximize the following sum utility as $l \to \infty$:

$$\sum_{i=1}^{M} U_i(\bar{r}_i(l)) \quad \text{(Equ. 4)}$$

subject to $$\bigcup_{j=1}^{M_c} D_{j,l'} \subseteq B \forall$$

$$l' \in \{1, 2, \cdots, l\}$$

$$D_{j,l'} \cap D_{m,l'} = \emptyset,$$

$$j, m \in 1, 2, \ldots, M_c,$$

$$j \neq m$$

$$\forall l' \in \{1, 2, \cdots, l\}$$

where $U_i(\bar{r}_i(l))$ is the utility function for wireless device-i, expressed in the average rate of the wireless device-i up to subframe l, $\bar{r}_i$. $M_c = \sum_{i=1}^{M} \binom{M}{i} = 2^M - 1$ represents the number of user sets. $D_{j,l}$ represents the allocation decision for jth user set at subframe l defined as follows:

$D_{j,l} \triangleq \{k \in B: k$ is allocated to jth user set in subframe l$\}$.

To solve (Equ.4), a resource k at time l is assigned to j*th user set $\mathcal{M}$, which satisfies the following condition:

$$j^*: \underset{j}{\operatorname{argmax}} \left\{ \sum_{i \in \mathcal{M}_j} c_i^{\mathcal{M}_j}(k, l) U_i'(\bar{r}_i(k, l)) \right\} \quad \text{(Equ. 5)}$$

for $j = 1, 2, \ldots, M_c$ where $c_i^{\mathcal{M}_j}(k,l)$ is the expected throughput for wireless device-i in set $\mathcal{M}_j$ if all the wireless devices in $\mathcal{M}_j$ are simultaneously scheduled on the resource k on subframe l. $U'_i(\bar{r}_i(k, l))$, as defined in the previous section, is the first order derivative of the utility function at $\bar{r}_i(k,l)$.

In other words, (Equ.5) states that a resource is allocated to a user set with the highest sum of instantaneous throughput of each wireless device in the user set weighted by their corresponding marginal gains in utilities at the current throughput.

$c_i^{\mathcal{M}_j}(k, l)$ can be expressed for wireless device-i, which is assumed to have $\eta_i$ transmission layers, as the sum of throughputs on all layers like in the SU-MIMO case.

$$c_{i,\ell}^{\mathcal{M}_j}(k, l) = N_{RE}^{PRB} \log_2 \left\{ 1 + \beta \rho_{i,\ell}^{\mathcal{M}_j}(k, l, p(k, l)/\eta_i) \right\}$$

$\rho_{i,\ell}^{\mathcal{M}_j}(k,l,p(k,l)/\eta_i)$, the SINR for lth layer of wireless device-i can be computed, for example assuming a zero-forcing (ZF) MU-MIMO precoder as shown in [6]. $\rho_{i,\ell}^{\mathcal{M}_j}(k, l,p(k,l)/\eta_i)$ includes the inter-wireless device and inter-layer interference.

For example, for a generalized utility function $U_i(x)$ with fairness parameter $\alpha$ defined as follows [7]:

$$U_i(x) = \begin{cases} \dfrac{x^{1-\alpha}}{1-\alpha} & \text{for } \alpha \geq 0; \alpha \neq 1 \\ \log(x) & \text{for } \alpha = 1 \end{cases}$$

the criterion for MU-MIMO resource allocation becomes the following:

$$j^*: \underset{j}{\operatorname{argmax}} \left\{ \sum_{i \in \mathcal{M}_j} \dfrac{c_i^{\mathcal{M}_j}(f)}{\bar{r}_i^{\alpha}} \right\} \quad \text{(Equ. 6)}$$

for $j = 1, 2, \ldots, M_c$

Numerical Results

The performance of the proposed resource allocation algorithm is evaluated for OFDMA system with 100 PRBs, 12 subcarriers per PRB and each PRB with a bandwidth of 360 kHz, at carrier frequency of 3 GHz. Each subframe is of duration 0.5 ms and comprises 14 OFDM symbols. The transmission channel used is the 3GPP SCM-5G model [4]. The base station comprises a single cell configured with a 64 antenna element AAS in 4×8×2 configuration, i.e. 4 rows, 8 columns and 2 polarizations. Each wireless device is equipped with a single isotropic antenna element. It is assumed that the transmission channel response for all the links is perfectly known at the base station in computing the precoders. Wireless devices are placed randomly within the cell coverage area, which is a 120 degree sector around the antenna bore-sight and with a cell radius of 500 m. PRBs are allocated every subframe by evaluating the criterion defined in (Equ.6).

To reduce the computational complexity, the average wireless device rates $\{\tilde{r}_i, i=1, 2, \ldots, M\}$ are only updated at the end of each subframe as follows:

$$\bar{r}_i(l) = \delta \bar{r}_i(l-1) + (1-\delta) r_i(l-1)$$

where $\delta \in [0,1)$ is the forgetting factor. $r_i(l)$ represents the scheduled rate on subframe l for wireless device-i expressed as the sum of throughputs across all the allocated resources to all the user sets that consist of wireless device-i. $r_i(l)$ can be mathematically expressed as follows:

$$r_i(l) = \sum_{j=1}^{M_c} \sum_{k \in D_{j,l}} c_i^{\mathcal{M}_j}(k, l) 1_{\{i \in \mathcal{M}_j\}}$$

where $1_{\{A\}}$ is an indicator function that is 1 if A is true, 0 otherwise. In the above equation, we assume that $N_{RE}^{PRB}$ for all the PRBs is the same. Next we present the precoder computations assumed in the simulation.

If $H_{kl}(u)$ represents the $1 \times N_T$ transmission channel matrix between the base station and wireless device-u at subframe-l and PRB-k, a composite channel matrix, $H_{kl}$ can be formed by concatenating multiple wireless devices channel matrices. Then the DL transmission can use a precoder $W_{kl}$, which can be computed as follows:

$$W_{kl} = H_{kl}^H (H_{kl} H_{kl}^H + \Gamma_{kl})^{-1}$$

where $H_{kl} = [H_{kl}(u_1)^T\ H_{kl}(u_2)^T \ldots H_{kl}(u_M)^T]^T$ is of dimension $M \times N_T$, $(\bullet)^H$ represents the Hermitian transpose operation. As mentioned earlier, we assume single-element receive antenna at each wireless device thus each wireless device has a transmit rank of 1, and we can use the term "layer" and "wireless device" interchangeably.

$$\Gamma_{kl} = \delta_{kl}^2 I_M$$

is the regularization factor for matrix inversion to avoid numerical issues. $\delta_{kl}^2$ are chosen following standard techniques. $I_M$ is the identity matrix of size M.

Precoder for the ith wireless device at subframe l and PRB k, $W_{kl}^{(i)}$ is further normalized to have equal power per layer (wireless device).

$$\tilde{W}_{kl}^{(i)} = \frac{1}{M} \frac{W_{kl}(:,i)}{\|W_{kl}(:,i)\|_F}$$

where $W_{kl}(:,i)$ represents the ith column of $W_{kl}$, and $\|X\|_F$ is the Frobenius norm of the matrix X.

Subsequently a receive SINR estimate for ith layer/wireless device, $\gamma_i$, can be computed for the MU-MIMO weights assuming maximal ratio combining (MRC) detection at the UE:

$$\rho_{i\ell} = P_\ell^H \left\{ \sum_{j \neq \ell} P_j P_j^H + \Sigma \right\}^{-1} P_\ell$$

where $P_j$ represents the jth column of $P = H_{kl} \tilde{W}_{kl}$ and $\Sigma = N_0 I_M$ is the covariance term where $N_0$ is the average thermal noise power at each wireless device antenna.

The total transmit power of 43 dBm is equally divided across all the PRBs. Once SINR per wireless device for a user set are computed, the capacities are calculated using (Equ.3). To further reduce the computational complexity, precoder is computed only once every subframe assuming all the wireless devices are co-scheduled on all PRBs. If there is a subset of wireless devices are co-scheduled on a specific subframe, the transmit power is readjusted accordingly, but the precoder is not recomputed. However, if only one wireless device is scheduled then SU-MIMO precoder is used.

The simulations were run for 1000 channel realizations, M=2 to 8 randomly deployed wireless devices within the coverage area. Channel mobility for each wireless device corresponds to pedestrian speed of 3 kmph. For each realization, average wireless device throughput, derived wireless device utility etc., are recorded at the end of simulation time of 5 seconds. All wireless devices are assumed to have full-buffer traffic and are available for MU pairing every subframe.

Figure 8:
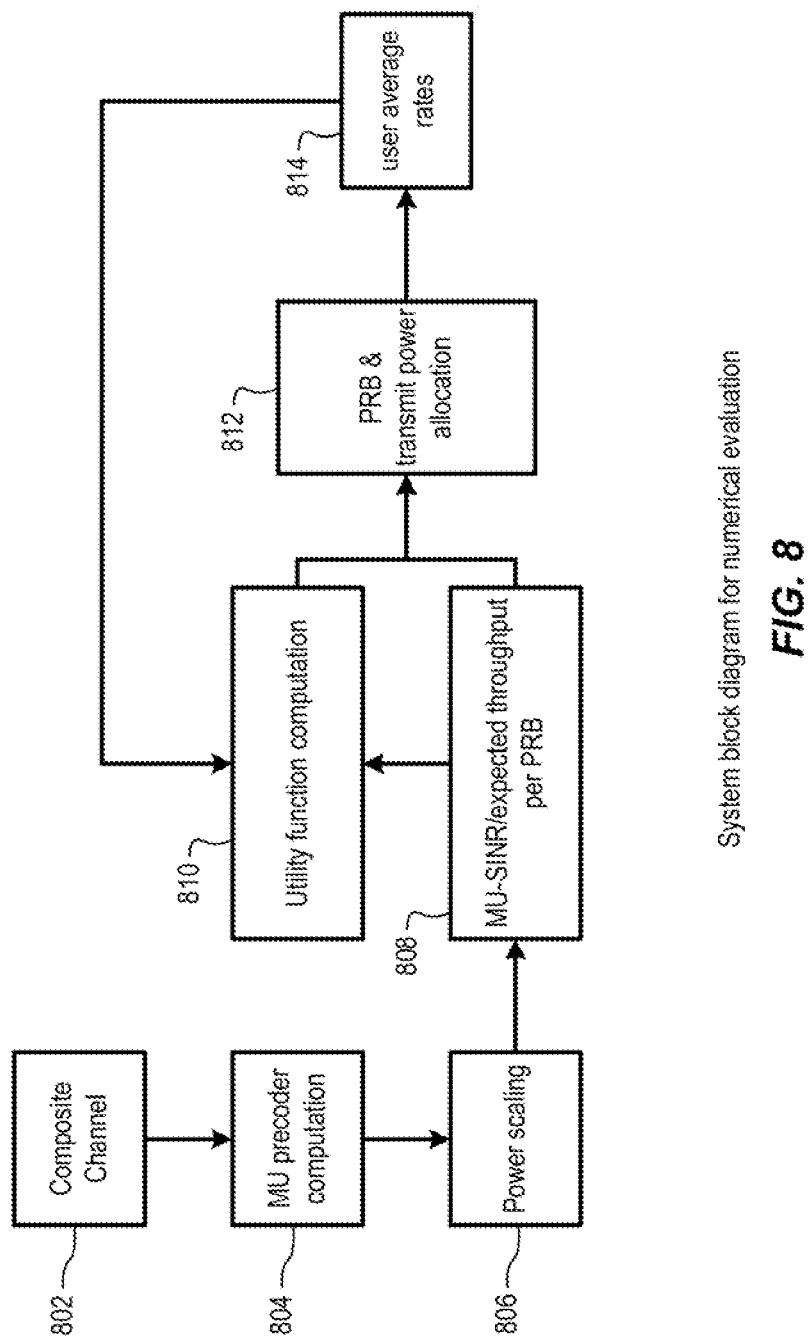
FIG. 8 illustrates a system block diagram for numerical evaluations according to some embodiments of the present disclosure.

The overall simulation steps are depicted in FIG. 8. In the block diagram of FIG. 8, principle steps are illustrated by blocks or modules, each of which may be implemented by any suitable combination of hardware and software. Referring to FIG. 8:

For each user set, a composite channel matrix, $H_{kl}$ is formed (at 802) by concatenating the respective channel matrices for each wireless device in the user set, as described above;

The composite channel matrix, $H_{kl}$ is then used (at 804) to compute the precoder $W_{kl}$ as described above;

The precoder $\tilde{W}_{kl}$ may then be regularized and normalized (at 806) as described above;

The normalized precoder $W_{kl}$ can then be used (at 808) to estimate the MU-SINR and the expected throughput per PRB. This information, in combination with average data rates for each user (i.e. for each wireless device in the user set) can be used (at 810) to compute the utility function $U_i(\bar{r}_i(l))$ for example in accordance with (Equ.4) above. The utility function can then be used, in combination with the PRB and transmit power allocation (at 812) to compute (at 814) the average data rate for each wireless device in the user set.

In FIGS. 9-12, a is set to 1, i.e. proportional fair allocation is used. The following scenarios are simulated:

Optimum MU allocation: Based on the proposed optimum criteria in (Equ.6)

Greedy MU allocation: which implies pairing all available uses all the time across all resources Optimum SU allocation: Based on the proposed optimum criteria in (Equ. 2)

Figure 9:
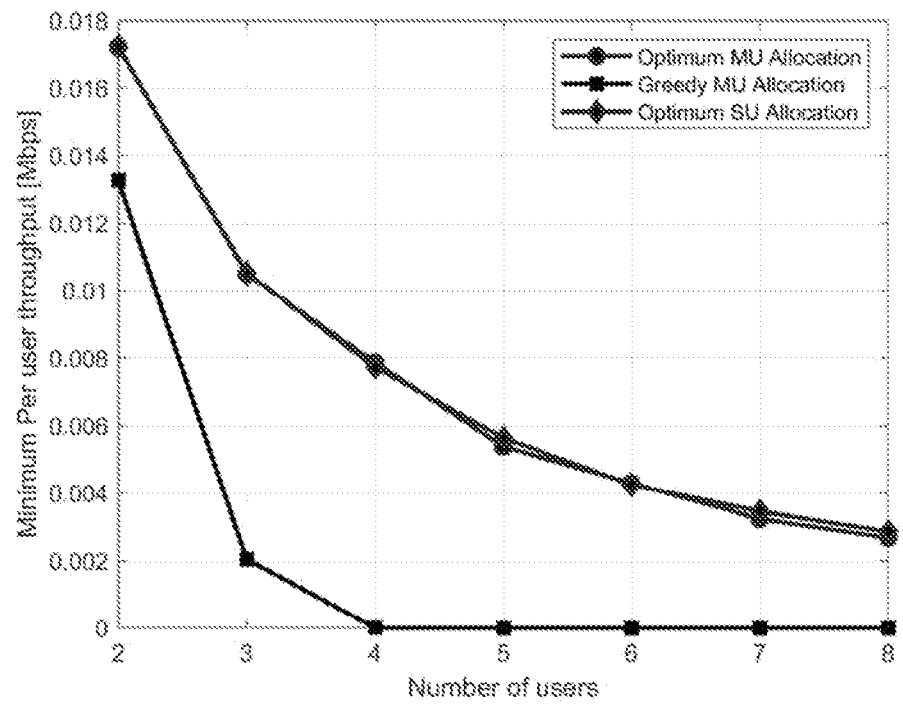
FIGS. 9-14 illustrate simulation results from numerical evaluations according to some embodiments of the present disclosure.
Figure 10:
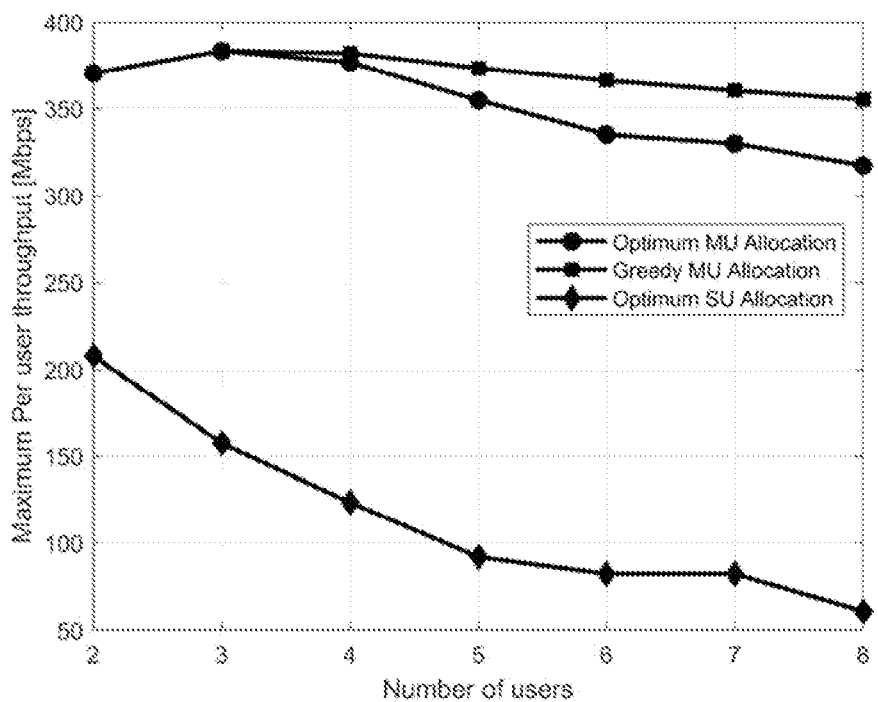

FIGS. 9 and 10 show the minimum and maximum average wireless device throughputs as a function of number of wireless devices in the system respectively. The minimum average wireless device throughput of the optimum SU-MIMO and MU-MIMO solutions are the same, however, is very much degraded for greedy MU allocation. This shows that the wireless device-pairing without the optimality check during allocation can degrade performance of some wireless devices drastically causing a concern for wireless device fairness.

Figure 11:
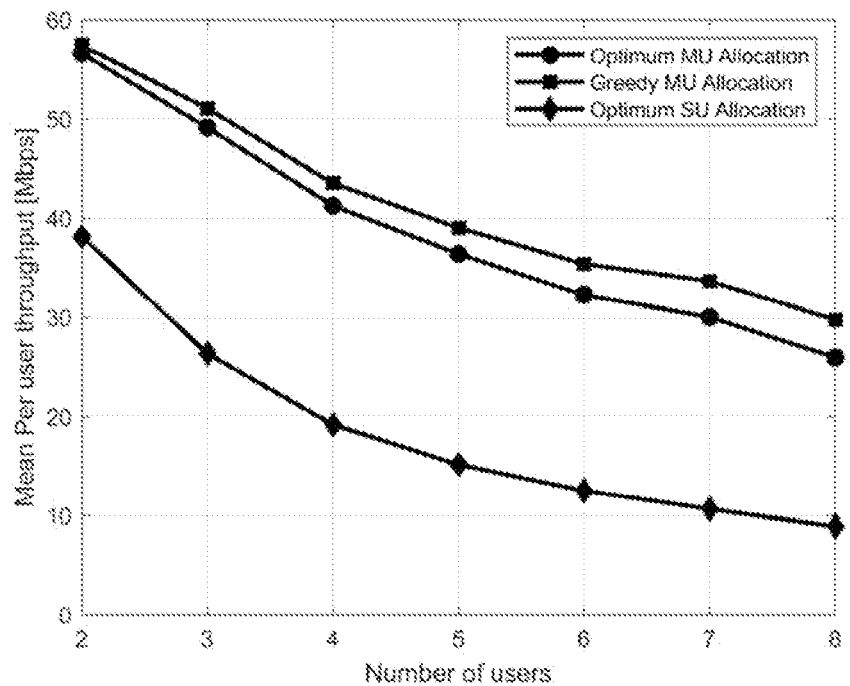
Figure 12:
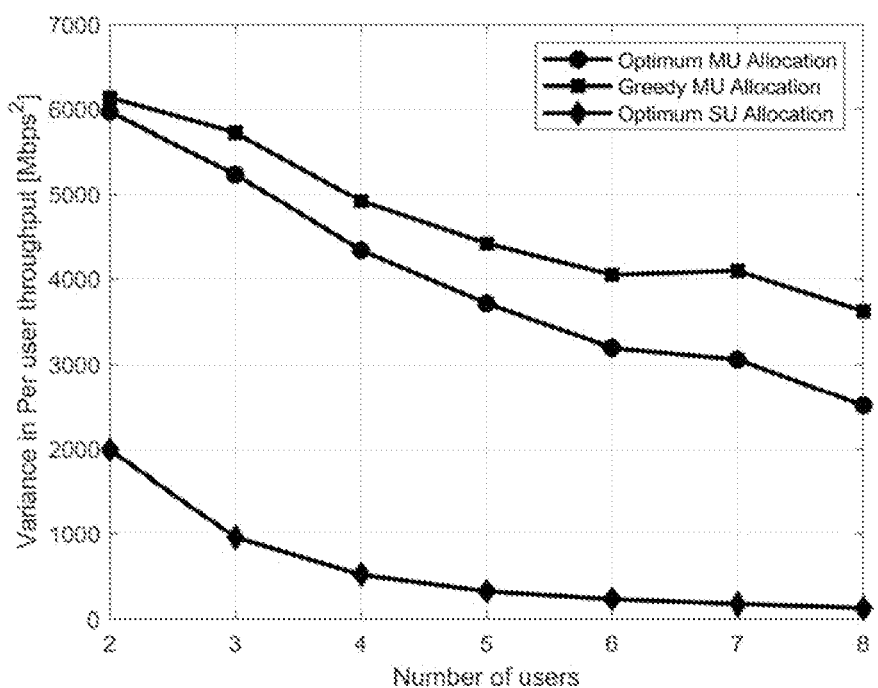

FIG. 11 shows the average wireless device throughput as a function of number of wireless devices. It is evident that the average wireless device throughput is increased by a factor of approximately 1.4 and 3 for 2 wireless devices and 8 wireless devices respectively. The average wireless device throughput when all the wireless devices are always paired is higher than the optimal solution. However, as shown earlier, this increase in average wireless device throughput is due to degraded wireless device fairness, i.e. wireless devices with better channel quality when paired always unfairly benefitted. FIG. 12 shows the variance of average wireless device throughput as a function of number of wireless devices in the system. It is evident that the throughput variance for MU-MIMO is increased compared to SU-MIMO. This can be attributed to the varying nature of the inter-wireless device interference because of dynamic wireless device-pairing, which in turn causes the variations in the channel quality. It is also evident that as the number of wireless devices increase in the system, the variance of average wireless device throughputs for MU relative to SU increase significantly. This variance is also the source of exploiting capacity out of the system, and thus making opportunistic allocation promising in MU MIMO. Furthermore, these results show that the optimum MU solution provides a better control on the variance of average wireless device throughputs compared to a case where all the wireless devices are paired on all the resources.

Utility framework we chose is generic, however it is often more insightful to analyze the fairness outcomes based on some scalar metrics that explore the trade-off between the average throughput and the induced variations. One such fairness index can be defined as follows:

$$F = \frac{\left(\sum_{i=1}^{M} \bar{r}_i\right)^2}{M \sum_{i=1}^{M} \bar{r}_i^2} \qquad \text{(Equ. 7)}$$

which represents the ratio of square of empirical average of the wireless device data rates and their variance.

Figure 13:
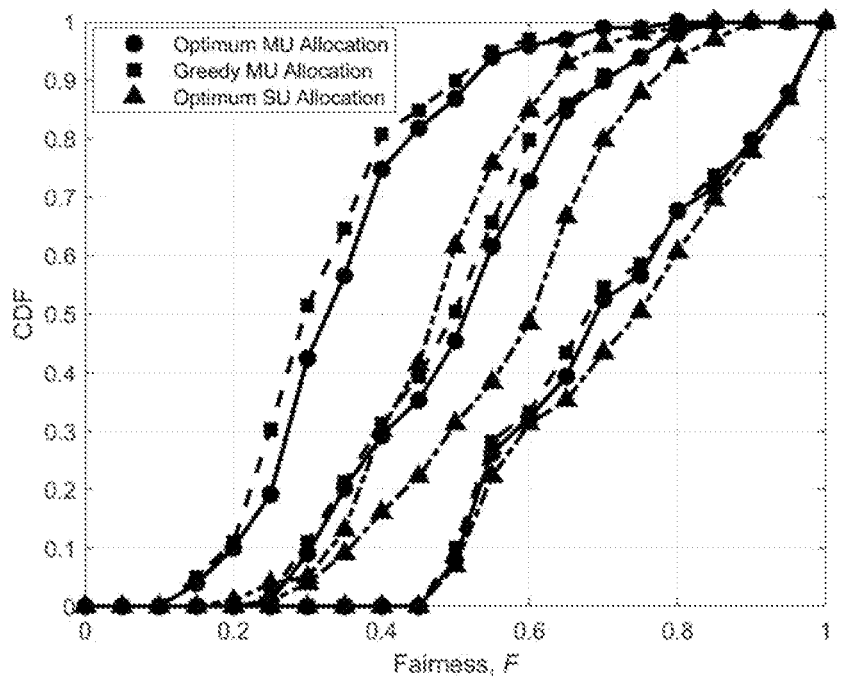

FIG. 13 shows the cumulative distribution function (CDF) of fairness index F, for M=2,4 and 8. It is evident that the fairness of SU-MIMO system is always the best. The results for MU-MIMO allocation is affected due to an increase in the variance of the wireless device throughputs (the denominator of (Equ.7)), mainly caused by the varying nature of inter-wireless device interference due to pairing with other wireless devices. This increase in variance dominates the increase in the average wireless device throughput (the numerator of (Equ.7)). Optimum MU allocation outperforms the greedy MU allocation consistently.

Figure 14:
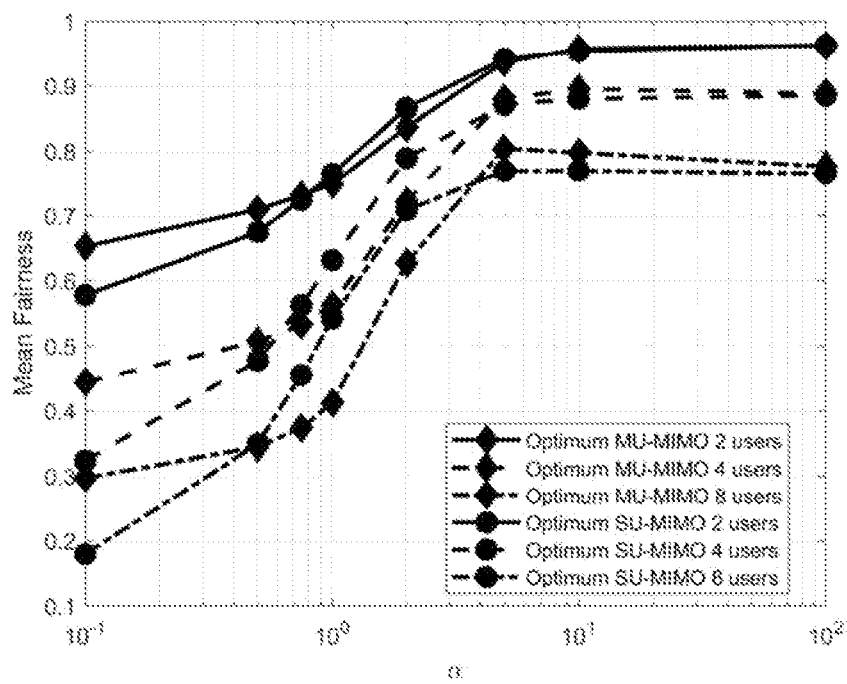

FIG. 14 depicts the mean fairness of Optimum MU and SU as a function of fairness parameter α. As expected the fairness increase as a increases for both optimum SU and MU resource allocation strategies. At the lower end of α, optimum MU is always better. This can be attributed coscheduling wireless devices with the best throughput. Both Optimum SU and MU strategies approach the same value at higher α. As the number of wireless devices in the system increase the fairness decrease for both SU and MU at a given α.

Figure 15:
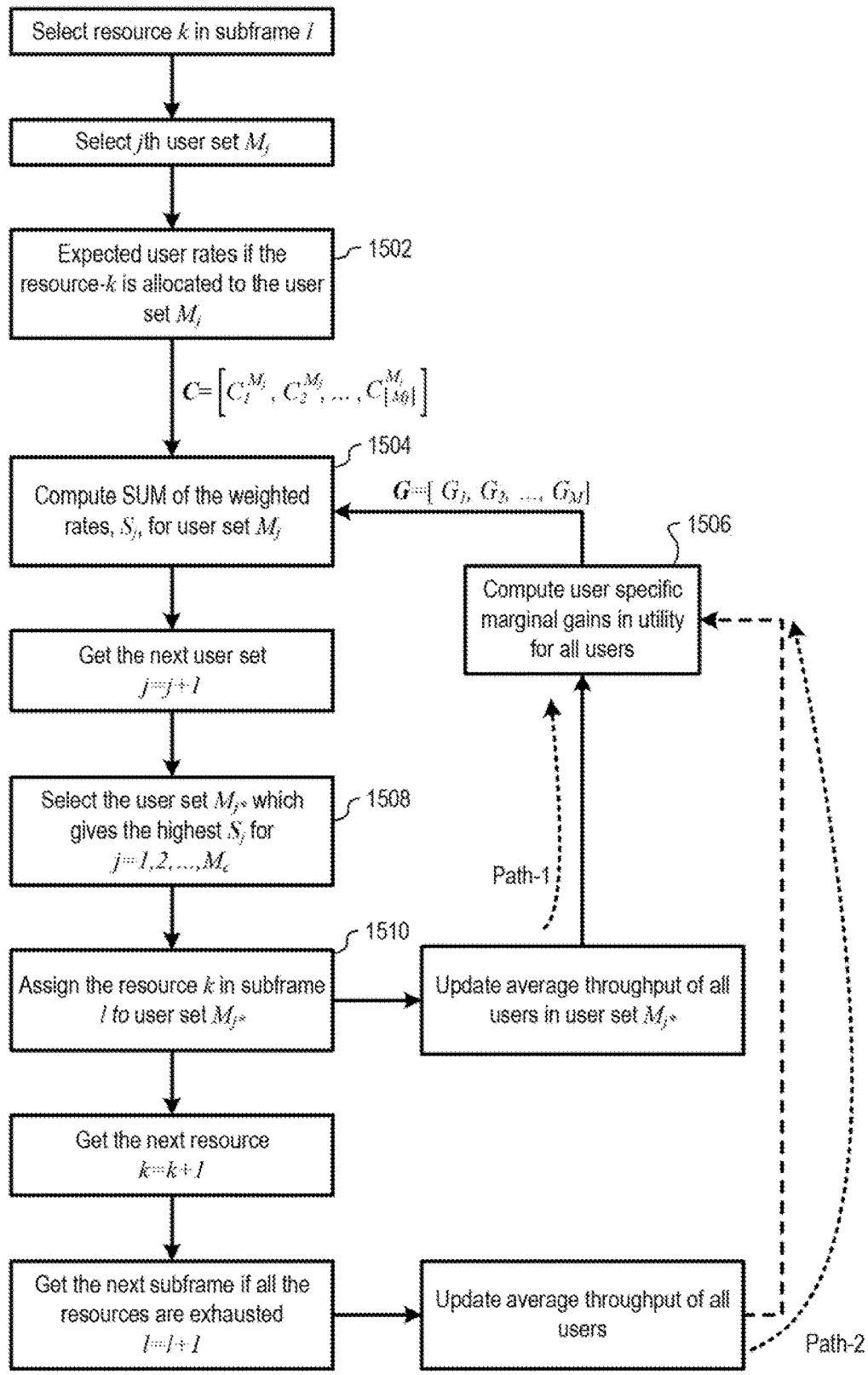
FIG. 15 is a system block diagram for numerical evaluation of resource allocation algorithms according to some embodiments of the present disclosure.

FIG. 15 illustrates a block diagram for a resource allocation method according to some embodiments of the present disclosure. At least some steps of the method may be performed at a network node 104. One or more wireless devices 106 are considered. Specific steps are next described. At the time of allocation of resource k in subframe l, (where k, l are positive integers), the wireless devices which have data to transfer are formed into multiple user sets. For example, if there are 2 wireless devices; wireless device-$n_0$ and wireless device-$n_1$, with data to transfer, three user sets can be formed: $\mathcal{M}_1 = \{n_0\}$, $\mathcal{M}_2 = \{n_1\}$ and $\mathcal{M}_3 = \{n_0, n_1\}$ For each user set, expected data rates are computed (at 1502) for the resource under consideration, i.e., resource k in subframe l. To estimate the data rates, the network node should determine the expected SINR at each wireless device in the user set. The estimated SINR for each wireless device is dependent on the user set, because of the inter-wireless device interference due to simultaneous transmission. Since the contribution of inter-wireless device interference is mainly controlled by the precoding, which is determined by the network node, network node can determine the SINR with reasonable accuracy.

In block 1504, the expected data rate of each wireless device is weighted by a wireless device-specific parameter which is derived from the average data rate of the wireless device until that instant (Path-1 as shown in FIG. 15). Alternatively, can be derived from the average data rate of the wireless device measured at the beginning of the subframe l (Path-2 as shown in FIG. 15). For example, can be derived (at 1506) as marginal gain in utility, $U'_i(\bar{r}_i(k, l))$, as defined in the previous section, which is the first order derivative of the utility function at the wireless device's average rate, $\bar{r}_i(k,l)$. Marginal gain in utility, $U'_i(x)$, can either be computed analytically or numerically, by approximating the differentiation with finite differences. That is, marginal gain in utility can be determined as an average slope determined from previous utility values during the previous scheduling instants.

As an example, $U'_i(\bar{r}_i(k,l))$ can be numerically derived from the previous three scheduling instants as follows [9]:

$$U'_i(\bar{r}_i(k, l)) \cong$$
$$U(\bar{r}_i(k, l-3)) \frac{(2\bar{r}_i(k, l) - \bar{r}_i(k, l-2) - \bar{r}_i(k, l-1))}{(\bar{r}_i(k, l-3) - \bar{r}_i(k, l-2))(\bar{r}_i(k, l-3) - \bar{r}_i(k, l-1))} +$$
$$U(\bar{r}_i(k, l-2)) \frac{(2\bar{r}_i(k, l) - \bar{r}_i(k, l-3) - \bar{r}_i(k, l-1))}{(\bar{r}_i(k, l-2) - \bar{r}_i(k, l-3))(\bar{r}_i(k, l-2) - \bar{r}_i(k, l-1))} +$$
$$U(\bar{r}_i(k, l-1)) \frac{(2\bar{r}_i(k, l) - \bar{r}_i(k, l-2) - \bar{r}_i(k, l-3))}{(\bar{r}_i(k, l-1) - \bar{r}_i(k, l-2))(\bar{r}_i(k, l-1) - \bar{r}_i(k, l-3))}$$

This procedure can be extended to more than 3 previous instants, for example to improve the accuracy.

The resource is assigned to the user set with the highest sum of weighted data rates (at 1508 and 1510).

Figure 16:
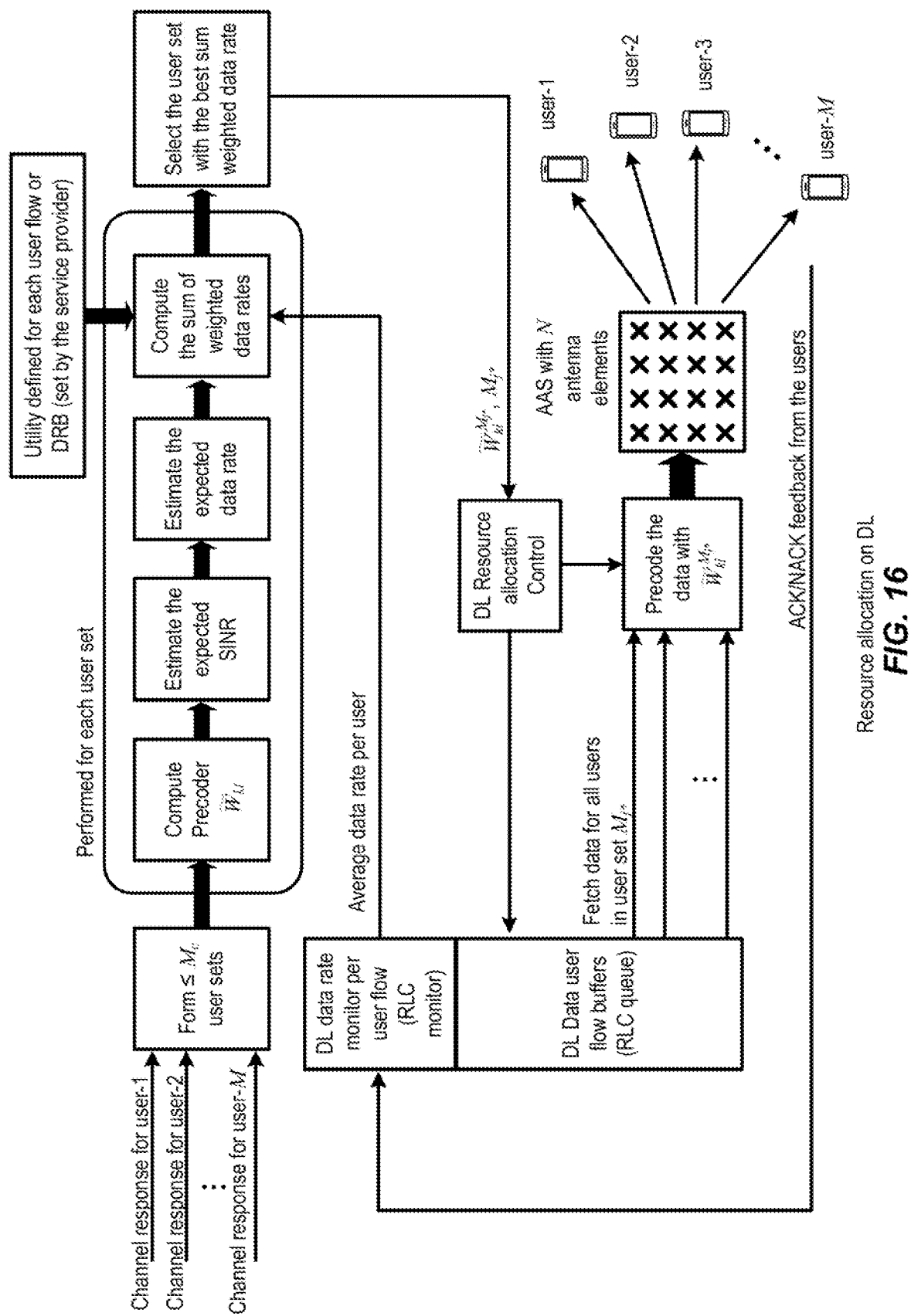
FIG. 16 illustrates a block diagram for resource allocation on DL according to some embodiments of the present disclosure.

FIG. 16 shows a block diagram of a DL allocation method according to some embodiments of the present disclosure. As shown the utility defined for each wireless device flow (wireless devices can have multiple flows associated, e.g. voice, ftp session, video download session etc.) and is normally decided by the service providers, such as Bell, Rogers or content providers. A utility function (module) defines the weights applied to each wireless device and in turn decides the user sets for resource allocation. The achieved data rates for each wireless device's flow is monitored actively at the RLC layer which will be used to derive the marginal gain in utility. Once the user set is selected, the precoder for the selected user set is applied on the data for each wireless device in the user set and transmitted over the AAS.

With respect at least to FIGS. 15 and 16, the expected wireless device data rate can be computed as a wide-band measurement or average over the full bandwidth of the carrier to simplify the computations. However, the resource allocation can occur every PRB. For example, if the carrier bandwidth spans 100 PRBs, the expected wireless device data rates are computed over 100 PRBs, but the resource allocation can be per PRB or any multiples of PRBs, in general. Similarly, the marginal gains in utility can be computed with a different granularity, updated after resource allocation or after multiple resource allocation steps. In general, the computation of expected wireless device data rates, marginal gains in utility and resource allocation can be computed over different periods.

Thus, some methods described herein may be used for resource allocation for OFDMA SU-MIMO and MU-MIMO.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the wireless device's computer, partly on the wireless device's computer, as a stand-alone software package, partly on the wireless device's computer and partly on a remote computer or entirely on the remote computer. In the latter scenario, the remote computer may be connected to the wireless device's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

REFERENCES

[1] J. Mo and J. Walrand, "Fair End-to-End Window-based Congestion Control," IEEE/ACM Trans. Net., vol. 8, no. 5, October 2000, pp. 556-67.
[2] Guocong Song and Ye Li, "Cross-layer optimization for OFDM wireless networks-part I: theoretical framework," in IEEE Transactions on Wireless Communications, vol. 4, no. 2, pp. 614-624, March 2005.
[3] S. Sadr, A. Anpalagan and K. Raahemifar, "Radio Resource Allocation Algorithms for the Downlink of Multiwireless device OFDM Communication Systems," in IEEE Communications Surveys & Tutorials, vol. 11, no. 3, pp. 92-106, 3rd Quarter 2009.
[4] 3GPP TR 38.900 V15.0.0 3rd Generation Partnership Project; Technical Specification Group Radio Access Network; Study on channel model for frequency spectrum above 6 GHz
[5] N. Kim, Y. Lee and H. Park, "Performance Analysis of MIMO System with Linear MMSE Receiver", in IEEE Transactions on Wireless Communications, vol. 7, no. 11, pp. 4474-4478, November 2008.
[6] P. Lin and S. Tsai, "Performance Analysis and Algorithm Designs for Transmit Antenna Selection in Linearly Precoded Multiwireless device MIMO Systems," in IEEE Transactions on Vehicular Technology, vol. 61, no. 4, pp. 1698-1708, May 2012
[7] P. Viswanath, D. N. C. Tse and R. Laroia, "Opportunistic beamforming using dumb antennas," in IEEE Transactions on Information Theory, vol. 48, no. 6, pp. 1277-1294, June 2002.
[8] Xiaoxin Qiu and K. Chawla, "On the performance of adaptive modulation in cellular systems," in IEEE Transactions on Communications, vol. 47, no. 6, pp. 884-895, June 1999.
[9] Steven C. Chapra, Applied Numerical Methods with MATLAB for Engineers and Scientists, Third Edition, McGraw-Hill Publishing: http://mec.nit.acir/file_part/master_doc/2015923203616561420321288.pdf

What is claimed is:

1. A method of resource allocation at a network node, the method comprising:
for each user set among at least two predefined user sets:
estimating expected data rates for wireless devices in the user set; and
computing a weighted sum of the expected rates of the wireless devices in the user set, the computing of the weighted sum including:

computing an average data rate for each wireless device in the user set, after an assignment of a previous subframe or a previous resource;
computing marginal gain in utility for each wireless device in the user set based on the computed average data rate of the wireless device;
computing a weighted estimated data rate by multiplying the expected rate of each wireless device in the user set with the corresponding wireless device's marginal gain in utility; and
summing all the weighted estimated data rates of all the wireless device in the user set; and
assigning a selected radio resource to the user set with the highest weighted sum.

2. The method as claimed in claim 1, wherein each user set comprises at least one wireless device.

3. The method as claimed in claim 1, wherein estimating the expected data rate of a wireless device in a selected user set comprises:
estimating an expected received Signal to Interference plus Noise Ratio (SINR) at a wireless device based on a transmission from the network node to all the wireless devices in the user set on a selected radio resource; and
further estimating an information data rate for a number of modulation symbols in the radio resource that can be used for data transmission based on the estimated SINR.

4. The method as claimed in claim 1, wherein estimating the expected data rate of a wireless device in a selected user set comprises:
estimating a received Signal to Interference plus Noise Ratio (SINR) at the network node based on transmissions from all the wireless devices in the user set to the network node on a selected radio resource; and
further estimating an information data for a number of modulation symbols in the radio resource that can be used for data transmission based on the estimated SINR.

5. The method as claimed in claim 1, wherein computing the weighted sum of the expected rates of the wireless devices in the user set comprises:
computing the average data rate for all active wireless devices in a system after an assignment of a previous subframe;
computing marginal gains in utility for each wireless device in the user set based on the computed average data rate of the wireless device;
computing the weighted estimated rate by multiplying the expected rate of each wireless device in the user set with the corresponding wireless device's marginal utility; and
summing all the weighted estimated data rates of all the wireless device in the user set.

6. The method as claimed in claim 1, wherein computing the marginal gain in utility comprises calculating a first derivative of a predefined wireless device-specific utility function at the average rate of the wireless device.

7. The method as claimed in claim 1, wherein computing the marginal gain in utility comprises:
calculating utility a predefined wireless device-specific utility function at the average rate of the wireless device; and
determining the marginal gain in utility as an average slope determined from previous utilities during previous scheduling instants.

8. The method as claimed in claim 7, wherein the average slope is determined from at least two utilities measured at consecutive scheduling instants.

9. The method as claimed in claim 1, wherein utility functions for respective wireless devices are different.

10. The method as claimed in claim 1, wherein assigning the resource comprises:
comparing the weighted sum of estimated data rates for all the user sets;
selecting the user set corresponding to the highest weighted sum;
selecting an appropriate transmission parameter for each wireless device in the user set; and
allocating the resource to all the wireless devices in the user set for simultaneous transmission.

11. The method as claimed in claim 10, wherein selecting the appropriate transmission parameter comprises determining a Modulation and Coding Scheme (MCS) such that a success rate of the transmission meets a target packet error rate.

12. The method as claimed in claim 11, wherein determining the MCS comprises selecting one of the MCSs defined in 3GPP TS 38.214.

13. The method as claimed in claim 11, wherein determining the MCS comprises selecting one of the MCSs defined in 3GPP TS 36.213.

14. A network node comprising a memory storing computer instructions for resource allocation, and processing circuitry configured to execute the computer instructions for resource allocation such that the processing circuitry is configured to:
for each user set among at least two predefined user sets:
estimate expected data rates for wireless devices in the user set; and
compute a weighted sum of the expected rates of the wireless devices in the user set, the computing of the weighted sum including:
computing an average data rate for each wireless device in the user set, after an assignment of a previous subframe or a previous resource;
computing marginal gain in utility for each wireless device in the user set based on the computed average data rate of the wireless device;
computing a weighted estimated data rate by multiplying the expected rate of each wireless device in the user set with the corresponding wireless device's marginal gain in utility; and
summing all the weighted estimated data rates of all the wireless device in the user set; and
assign a selected radio resource to the user set with the highest weighted sum.

15. The network node as claimed in claim 14, wherein each user set comprises at least one wireless device.

16. The network node as claimed in claim 14, wherein estimating the expected data rate of a wireless device in a selected user set comprises:
estimating an expected received Signal to Interference plus Noise Ratio (SINR) at a wireless device based on a transmission from the network node to all the wireless devices in the user set on a selected radio resource; and
further estimating an information data rate for a number of modulation symbols in the radio resource that can be used for data transmission based on the estimated SINR.

17. The network node as claimed in claim 14, wherein estimating the expected data rate of a wireless device in a selected user set comprises:

estimating a received Signal to Interference plus Noise Ratio (SINR) at the network node based on transmissions from all the wireless devices in the user set to the network node on a selected radio resource; and further estimating an information data rate for a number of modulation symbols in the radio resource that can be used for data transmission based on the estimated SINR.

18. The network node as claimed in claim 14, wherein computing the weighted sum of the expected rates of the wireless devices in the user set comprises:

computing the average data rate for all active wireless devices in a system after an assignment of a previous subframe;

computing marginal gains in utility for each wireless device in the user set based on the computed average data rate of the wireless device;

computing the weighted estimated rate by multiplying the expected rate of each wireless device in the user set with the corresponding wireless device's marginal utility; and summing all the weighted estimated data rates of all the wireless device in the user set.

\* \* \* \* \*